March 5, 1946.    R. HAPPE ET AL    2,396,007
PORTABLE ELECTRIC DRILL
Filed June 16, 1944    2 Sheets-Sheet 1
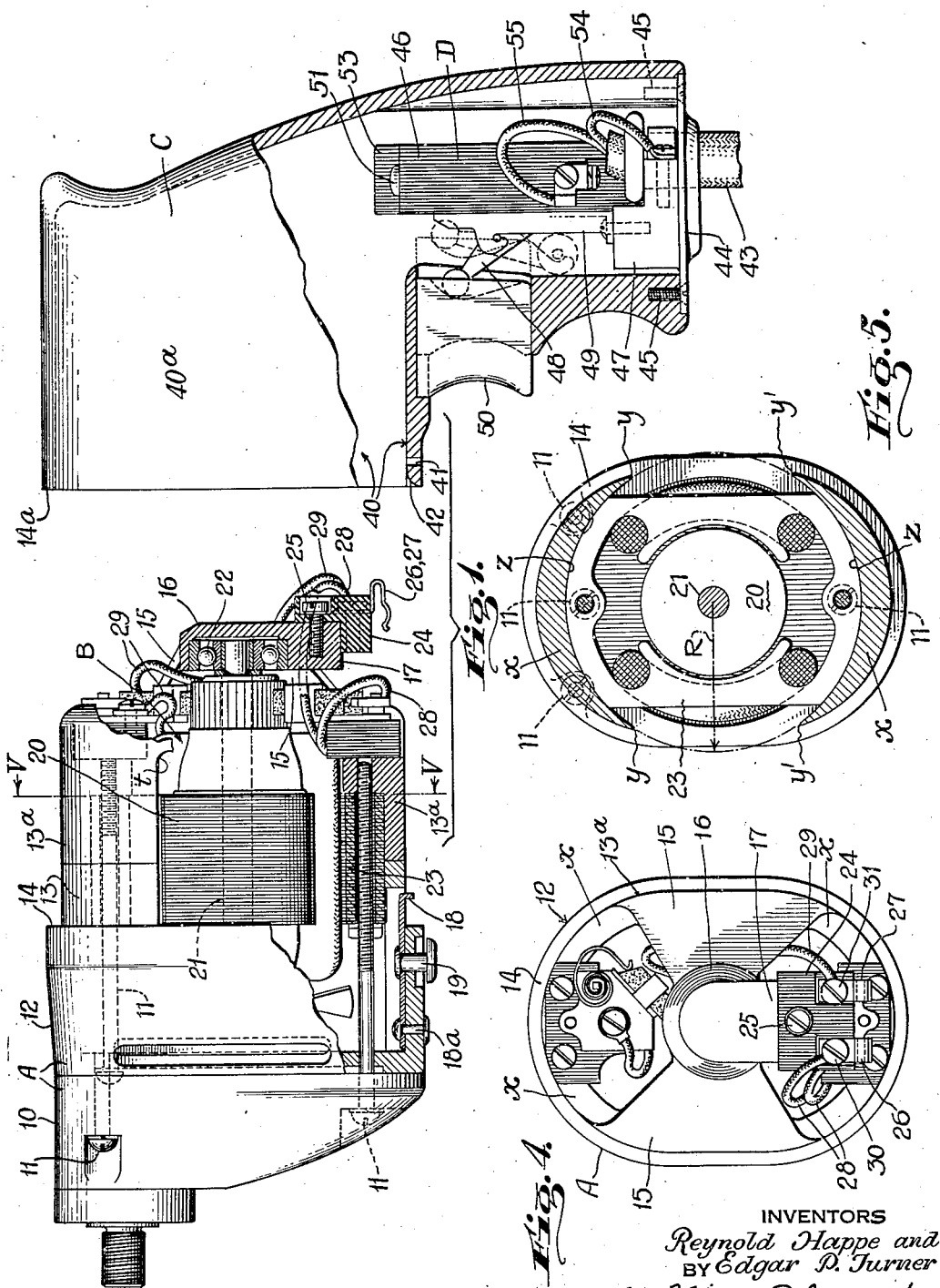
INVENTORS
Reynold Happe and
BY Edgar P. Turner
ATTORNEY

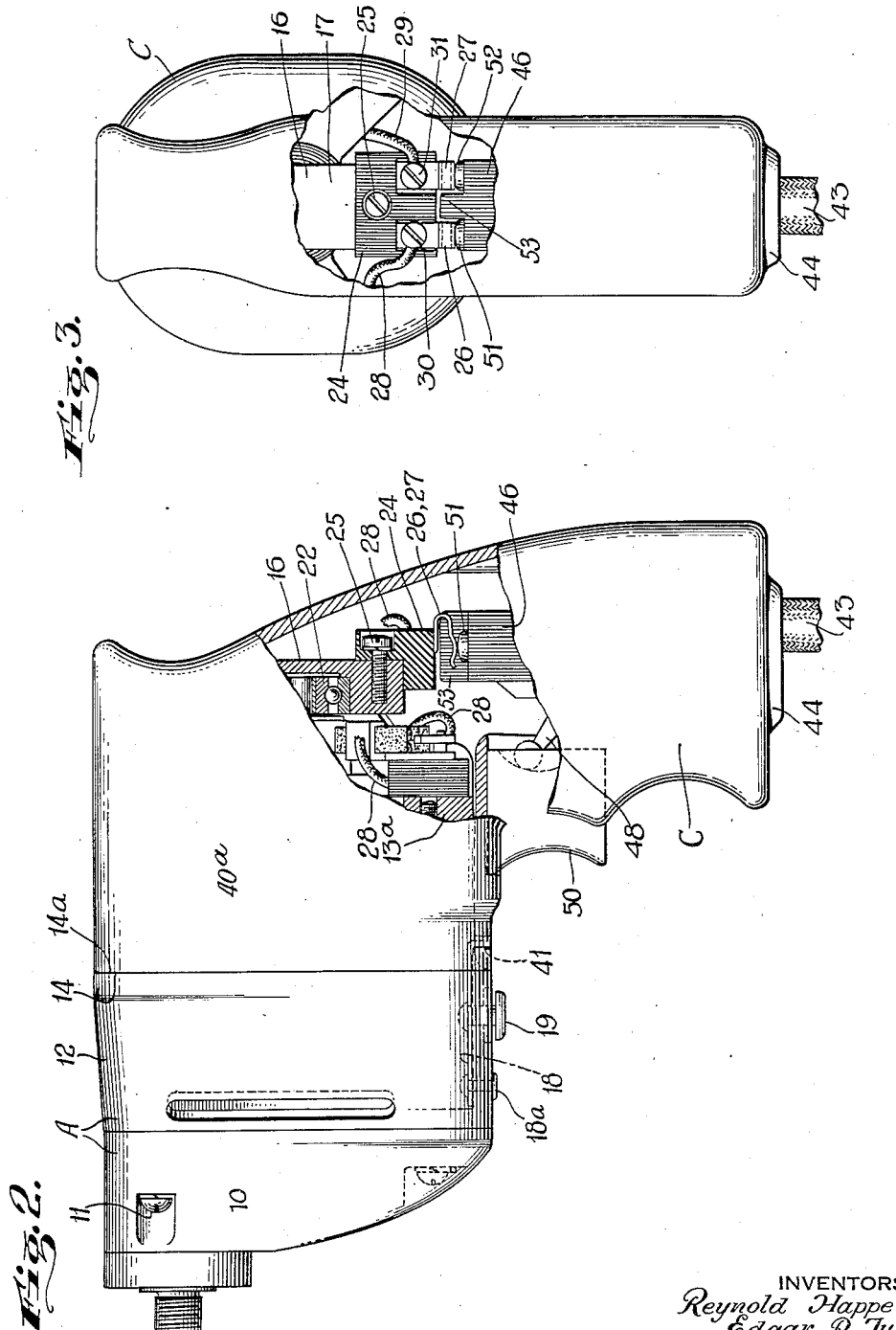

Patented Mar. 5, 1946

2,396,007

UNITED STATES PATENT OFFICE 2,396,007

PORTABLE ELECTRIC DRILL

Reynold Happe, Pittstown, and Edgar P. Turner, Fanwood, N. J., assignors to The Singer Manufacturing Company, Elizabeth, N. J., a corporation of New Jersey Application June 16, 1944, Serial No. 540,709

11 Claims. (Cl. 172—36)

This invention relates to electric tools, and more specifically to the construction and mounting of portable electric hand drills. The invention will be described in its application to an electric drill but it will be obvious from that particular description that the invention can be applied with equal facility to many other electrical machines.

It is an object of the invention to make an electric hand drill in which the working parts are compactly assembled in a casing which exposes the elements which require most frequent adjustment and to assemble in a handle, which acts as a cover for the exposed working parts, the controlling parts of the drill, so that the casing and handle when assembled constitute a complete, operating, fully protected unit.

Another object of the invention is to make a drill of the type described whose working and controlling parts can be instantly dismantled and which require no screws to hold them in position.

Still another object of this invention is so to construct an electric hand drill that the inner surfaces of the motor casing, which hold the stator core, may be machined in a single operation by relative rotation between a tool and the workpiece and in which the stator core, fitted in the motor casing, is materially larger than was possible in drills of like size, as heretofore constructed; thus producing a more powerful motor.

The objects of the invention are attained, generally speaking, by assembling the working parts of the drill in a casing having a flattened cylindrical rearward portion which exposes those working parts of the electric motor which need most frequent adjustment, and by assembling the controlling parts in a handle which has a flattened cylindrical portion of which the interior surface has a snug fit with the exterior surface of the correspondingly shaped part of the casing, the two parts of the drill having cooperating electrical contacts which automatically close when the parts are assembled.

Other objects of the invention and their method of accomplishment will be apparent from a consideration of the specification and drawings:

In the drawings:

Fig. 1 is a dismantled side view of an electric drill constructed in accordance with the principles of my invention with parts of the casing and handle broken away.

Fig. 2 is an assembled side view of an electric drill constructed in accordance with my invention, with a part of the handle and casing broken away.

Fig. 3 is a rear end view of the same drill with a part of the handle broken away.

Fig. 4 is a rear end view of the casing.

Fig. 5 is a section on the line V—V of Fig. 1.

The improved tool is shown as comprising a casing A having a removable head 10 which is attached to a body portion 12. The casing has a rear flattened cylindrical portion 13 and an abutment 14 between the portions 12 and 13. Secured to the portion 13, in end-to-end abutting relation therewith, is a second flattened cylindrical portion 13ª having web-like supports 15 across the back thereof carrying a bearing mounting 16 and a support 17 designated to carry certain of the working parts. The portion 12 carries a snap latch 18, comprising a piece of spring steel with a down turned end, a rivet 18ª which holds the spring in place, and a button 19 welded to the spring so that the spring may be disengaged by pressure. This latch serves to hold certain of the parts assembled, as later will be described. The casing A, comprising the elements 10, 12, 13 and 13ª, and a portion 40ª of a handle element, later to described, which covers the portions 13, 13ª preferably are of flattened cylindrical shape, as shown in Fig. 4. For convenience, and for the want of a more correct term to describe the outline of those elements, they will hereinafter be referred to as being "cylindrical" but it is to be understood that the term "cylindrical" is intended to include the shape shown in Figs. 4 and 5 and other generally similar shapes.

B represents the working parts of the drill which are assembled as a unit within the casing. Those working parts frequently include gears within the section 10 of the casing A, the motor, a fan if the casing is to be provided with fore and aft slots for cooling, bearings for the rotating parts, commutators, brushes and leads, and, in short, all those parts of the drill which, when supplied with electric power, do the work.

In the drawings some of those parts are diagrammatically indicated: 20 being a motor rotor, 21 a motor shaft and 22 a ball bearing for the rear end of the shaft seated in the bearing mounting 16; 23 is a motor stator. A block of insulating material 24 is mounted on the support 17 by a screw 25 and preferably carries spring contacts 26 and 27, which are connected to the stator and rotor by appropriate leads 28 and 29 which, being of standard construction need not be more fully described herein. Screws 30 and 31 mount the spring contacts 26, 27 in the block of insulating material 24 and connect the ends of the leads 28, 29 to them.

C indicates generally a handle for the drill having a cylindrical skirt portion 40ª provided with a bore 40 exactly conforming in size and shape to the exterior of the portions 13 and 13ª of the casing A. The forward face of said cylindrical portion 40ª forms an abutment 14ª conforming to abutment 14 of the casing, and a hole 41 receives the down turned end of latch 18. A cam lip 42 serves to direct the spring 18 into the hole 41 when the parts are assembled.

D indicates generally the controlling parts of the drill, within which term are included those parts which bring to and control the current which operates the working parts, including such things as the lead-in, contacts, switch and controllers. In the drawings, the lead-in cable 43 is mounted in a butt plate 44 attached to the handle by screws 45. A post 46 and a switch box 47 are mounted on the butt plate. A spring-pressed lever 48 for operating the switch is pivotally mounted on the standard 49, forming a part of the switch box 47, and a trigger 50 is mounted slidably in the handle against the lever 48. Contacts 51, 52 are preferably mounted on the top of the post 46 and separated from each other by the insulating material of the land 53, and are connected through the switch and suitable connections 54, 55 to the cable 43. If desired, the location of the contacts 26, 27 and the contacts 51, 52 may be reversed. Parts of the tool are preferably made as follows: the casing elements 12, 13 and 13ª are made, as for example, by molding or casting, with a flattened cylindrical outline as shown in Fig. 4 and with relatively heavy upper and lower walls as indicated by $x$ in that figure. The sidewalls of the elements 13 and 13ª, between the portions $x$, are initially formed with cast openings $t$ (one of which is shown partially in Fig. 1) in the region which ultimately receives the stator core.

After the elements have been formed as above described, with the openings $t$ in the sidewalls, a cutting tool is inserted into the open ends of the elements and, by relative rotation between the workpiece and the tool, the inner faces of the walls $x$ are machined on a radius R (Fig. 5) which radius is greater than one-half the width of the parts but less than one-half the height thereof. During this machining operation, the cutter extends outwardly from the casing through the openings $t$ and forms arcuate seats $z$ in the upper and lower portions of the elements 13 and 13ª, which seats receive the stator core, as shown in Fig. 5. In the finished product the openings in the sidewalls of the parts 13, 13ª, between the points $y$ and $y'$ (Fig. 5) give access to the stator core and to the field coils thereon.

It will be apparent that the stator core capable of being fitted between the seats $z$ is of materially greater height than would be possible if the machining of the seats were performed on a radius within the sidewalls of the elements 13, 13ª.

In the completed tool the openings in the sidewalls of the casing are covered by the skirt portion 40ª of the handle element C.

The device is assembled as follows: the working parts are assembled as a unit and mounted in the casing A which is held closed by the bolts 11. The controlling parts are assembled in the handle, and the cylindrical skirt portion 40ª of the handle is slid over the cylindrical portions 13, 13ª of the casing until the abutments 14 and 14ª meet and the latch 18 snaps into place in the slot 41. The two cylindrical surfaces conform exactly and form a tight fit which does not allow lateral play. Under these circumstances there is no need for bolts or other devices to prevent lateral displacement of the handle and the casing. A simple snap latch which will prevent longitudinal displacement is sufficient to make a complete and tight unit.

The rear of the casing is open except for the supporting webs 15, a construction which permits the operator to have instant access to the portions of the motor which require most frequent attention. Once the handle is removed, which is done by pressing the button 19 and sliding the handle off the casing, the openings in the ends of the casing give free access to the works, permitting adjustments of the commutator and brushes, and the tightening of lead connections. The motor illustrated in this case is of the two pole type, a type which gives a desirable flatness to the drill body, but any type of motor and shape of casing to fit it could be used with equal success so far as this invention is concerned.

The back of the casing carries two spring contacts 26, 27 which are easily connected in an appropriate electrical manner to the motor. These two spring contacts are shown as depending leaf springs. The interior of the handle contains two fixed contacts 51, 52 which are connected in an appropriate manner to the switch and to the power cable. When the parts of the drill are assembled, the leaf springs slide onto and make firm contact with the contacts in the handle. This contact remains unbroken so long as the drill is assembled and is automatically broken as soon as the drill is dismantled. Other types of contact, such as plugs and sockets, can be substituted if it is desired. Other types and locations of switches also can be substituted if desired.

It is because of the fact that the leads to the contacts 26, 27 and 51, 52 are made before the handle is applied to the casing and those contacts are automatically brought together by the application of the handle to the casing that it becomes possible and feasible to provide the handle with the skirt portion 40ª to cover the openings in the sidewalls of the motor casing.

As many apparently widely different embodiments of this invention may be made without departing from the spirit and scope thereof, it is to be understood that we do not limit ourselves to the specific embodiments thereof except as defined in the appended claims.

Having thus set forth the nature of the invention, what we claim herein is:

1. An electric tool comprising a casing; a motor therein, said casing having a rearward cylindrical portion with open sides and an open rear end crossed by a support for a motor bearing, the armature, field windings, brushes and rear shaft mounting of the motor being exposed through said open end, and the stator core being exposed through said open sides; a handle for said tool having a forwardly projecting cylindrical portion fitted upon and covering the rearward part of said casing and covering the openings in the sides thereof; and cooperating means for securing said handle to said casing.

2. An electric tool comprising a casing; a motor therein, said casing having a rearward cylindrical portion with open sides and an open rear end crossed by a support for a motor bearing, the armature, field windings, brushes and rear shaft mounting of the motor being exposed through said open end, and the stator core being exposed through said open sides; a handle for said tool having a forwardly projecting cylindrical portion fitted upon and covering the rearward part of said casing and covering the openings in the sides thereof; cooperating means for securing said handle to said casing, and an electric switch in said handle, said switch being connected to motor leads and to a source of power supply.

3. An electric tool comprising a casing; a motor therein, said casing having a rearward cylindrical portion with open sides and an open rear end crossed by a support for a motor bearing, the armature, field windings, brushes and rear shaft mounting of the motor being exposed through said open end and the stator core being exposed through said open sides; electrical contacts carried outside said casing and electrically connected to said motor; a handle for said drill having a forwardly projecting portion fitted upon and covering said rearward portion of said casing; electrical contacts carried by said handle and adapted to be brought into engagement with the contacts of said motor when said handle is applied to said casing; a conductor for electricity connected to the contacts in said handle; and means for securing said handle to said casing.

4. An electric tool comprising a casing; a motor therein, said casing having a rearward cylindrical portion and an open rear end crossed by a support for a motor bearing, the armature, field windings, brushes, and rear shaft mounting of the motor being exposed through said open end; spring contacts carried outside said casing and electrically connected to the motor; a spring latch carried by the said casing; a handle for said tool having a forwardly projecting housing with a cylindrical interior to fit and cover the rearward part of said casing; cooperating latch-receiving means on said handle; means to connect the handle to the source of current; and means to connect the source of current through the handle to said motor comprising a post within the handle, contacts on the post in position to be engaged by said spring contacts when the casing and handle are assembled, and a switch for controlling the current in the established circuit.

5. An electric tool comprising a casing; a motor therein, said casing having a rearward cylindrical portion and an open rear end crossed by a support for a motor bearing, the motor being exposed through said open end; spring contacts carried by said casing and electrically connected to the working parts of the tool; a handle for said tool having a forwardly projecting housing with a cylindrical interior to fit and cover the said rearward part of the casing; means to connect the handle to the source of current; means to connect the source of current through the handle to said motor comprising a post within the handle, contacts on the post in position to be engaged by said spring contacts when the casing and handle are assembled, and means to control the current in the established circuit; and a snap latch to keep the casing and the handle in assembled relation.

6. An electric drill comprising a casing; a motor therein, said casing having a rearward portion and an open rear end supporting a motor bearing, the motor being exposed through said open end; a pair of electrical contacts carried by said casing and electrically connected to the motor; a handle for said drill having a housing formed to fit and cover the rearward part of said casing; means to connect a source of current through the handle to said motor comprising means within the handle having a second pair of electrical contacts in position to be engaged by said first mentioned contacts when the casing and handle are assembled, one pair of said contacts being yieldable relative to the other pair and a switch for controlling the current in the established circuit; and means to keep the casing and the handle in assembled relation.

7. An electric drill having its working parts enclosed within a casing having a rearward cylindrical portion and an open rear end supporting a bearing; electrical contacts carried by said casing and electrically connected to the working parts; a handle having a housing with a cylindrical interior to fit the said rearward part of the casing; means to connect a source of current through the handle to said motor comprising electrical contacts carried by the handle in position to be engaged by said first mentioned contacts when said casing and handle are assembled; and means to control the current in the established circuit.

8. An electric drill having its working parts enclosed within a casing having a rearward cylindrical portion and an open rear end; contacts carried by said casing and electrically connected to the working parts; a handle having a housing with a cylindrical interior to fit the said rearward part of the casing; means to connect a source of current through the handle to said motor comprising contacts carried by said handle in position to be engaged by the first mentioned contacts when the casing and handle are assembled; and means to hold the contacts together.

9. An electrical machine having its working parts within a frame which has openings to expose said parts, and having its operating parts in a handle separable from said frame, the frame and handle having complemental electrical contacts, a substantial portion of said frame being exteriorly cylindrical, a portion of said handle being of conforming interior cylindrical shape, said portions having a snug fit that requires no lateral support, and a snap latch to hold the frame and the handle together.

10. An electrical machine having its working parts within a frame which has openings in its side walls to expose said parts, and having its controlling parts in a detachable handle, the frame and handle having complemental electrical contacts, a substantial portion of said frame being exteriorly cylindrical, a portion of said handle being of conforming interior cylindrical shape and fitted upon the cylindrical portion of said frame and closing the openings in said side walls, said cylindrical portions having a snug fit that requires no lateral support.

11. An electrical machine having its working parts within a frame which has openings to expose said parts and having its controlling parts within a detachable handle, said frame and handle having complemental electrical contacts, the frame and handle having a cooperating snug cylindrical fit and said handle covering said exposed parts.

REYNOLD HAPPE.
EDGAR P. TURNER.